United States Patent
Aas

(10) Patent No.: US 7,079,709 B2
(45) Date of Patent: *Jul. 18, 2006

(54) SCALING CONTROL FOR IMAGE SCANNERS

(75) Inventor: Eric F Aas, Windsor, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 16 days.

This patent is subject to a terminal disclaimer.

(21) Appl. No.: 10/696,184

(22) Filed: Oct. 29, 2003

(65) Prior Publication Data

US 2004/0086200 A1 May 6, 2004

Related U.S. Application Data

(63) Continuation of application No. 09/628,925, filed on Jul. 31, 2000, now Pat. No. 6,704,462.

(51) Int. Cl.
*G06K 9/32* (2006.01)

(52) U.S. Cl. ................ 382/298; 382/266; 382/293; 358/1.2; 358/3.27

(58) Field of Classification Search ........... 382/266, 382/269, 275, 286, 291, 293, 298, 299, 282; 358/1.2, 3.26, 3.27, 449, 505
See application file for complete search history.

(56) References Cited

U.S. PATENT DOCUMENTS

| 5,218,457 | A | * | 6/1993 | Burkhardt et al. | .......... 358/448 |
| 5,270,728 | A | * | 12/1993 | Lund et al. | .................... 347/5 |
| 5,321,529 | A | * | 6/1994 | Funada | ....................... 358/500 |
| 5,475,508 | A | * | 12/1995 | Maeshima et al. | .......... 358/514 |
| 5,549,111 | A | * | 8/1996 | Wright et al. | ............... 600/443 |
| 5,845,018 | A | | 12/1998 | Breish | |
| 6,704,462 | B1 | | 3/2004 | Aas | |

* cited by examiner

*Primary Examiner*—Samir Ahmed
*Assistant Examiner*—Yosef Kassa

(57) ABSTRACT

The present disclosure relates to a method for automatically scaling an image, comprising initially scanning an original image at an initial scanning resolution, detecting the relative positions of lateral edges of the original image, determining the width of the original image based upon the positions of the lateral edges, making an initial size presumption of the original image based upon the determined width, making a first scanning resolution determination based upon the initial size presumption, and continuing scanning of the original image based upon the first scanning resolution determination.

26 Claims, 4 Drawing Sheets

SCALING CONTROL FOR IMAGE SCANNERS

CROSS-REFERENCE TO RELATED APPLICATION

This application is a continuation of U.S. utility application entitled, "Scaling Control for Image Scanners," having Ser. No. 09/628,925, filed Jul. 31, 2000, now U.S. Pat. No. 6,704,462, which is entirely incorporated herein by reference.

FIELD OF THE INVENTION

The present disclosure relates to scaling control for image scanners. More particularly, the present invention relates to a method for automatically adjusting the scaling and resolution of images scanned by a scanner.

BACKGROUND OF THE INVENTION

As the use of the Internet has grown, so has the interest in Internet appliances. Such appliances typically comprise relatively low-cost devices specifically designed for use on-line without the need for a personal computer (PC). Due to their focused application, and to keep costs low, such devices normally have less memory and computing capacity as compared with conventional PCs.

Recently, demand for simplified scanning devices that can be used as Internet appliances has risen. Preferably, such devices would operate as stand alone devices that could be used to scan and transmit images over the Internet without the need for a PC. Such scanning devices could be used, for instance, to e-mail pictures and other images so that the images can be displayed on the recipient's monitor or television.

In that conventional scanners are used as peripheral equipment, the scanner normally receives instructions from a PC under the control of the user. Since conventional scanners typically scan each image at a preset optical resolution, a user may need to manually select a different scanning resolution if the user wishes to change the scale of the image. In situations where the scanner is to be used as an Internet appliance, however, the scanner must have the capability to process the scanned data internally. It is desirable to automate this processing, including scaling, to simplify the use of the scanner. Automatic scaling presents a challenge because the correct scanning resolution of the image, and therefore the correct scaling of the image, is not known until scanning of the entire image is completed. However, full scanning and possible rescanning of the entire image is undesirable, particularly in the Internet appliance context, in that such scanning delays image transmission and requires relatively large amounts of memory and computing power.

From the foregoing, it can be appreciated that it would be desirable to have a scanner which automatically determines the correct scanning resolution for each original image such that the image can be automatically scaled to obtain a full image having high resolution without the need to fully scan and rescan the image.

SUMMARY OF THE INVENTION

The present disclosure relates to a method for automatically scaling an image, comprising initially scanning an original image at an initial scanning resolution, detecting the relative positions of lateral edges of the original image, determining the width of the original image based upon the positions of the lateral edges, making an initial size presumption of the original image based upon the determined width, making a first scanning resolution determination based upon the initial size presumption, and continuing scanning of the original image based upon the first scanning resolution determination.

In a preferred embodiment, the method further comprises adjusting the scanning resolution based upon the first scanning resolution determination to obtain a new scanning resolution, and making a second size presumption if a bottom edge is not detected where expected based upon the initial size presumption.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
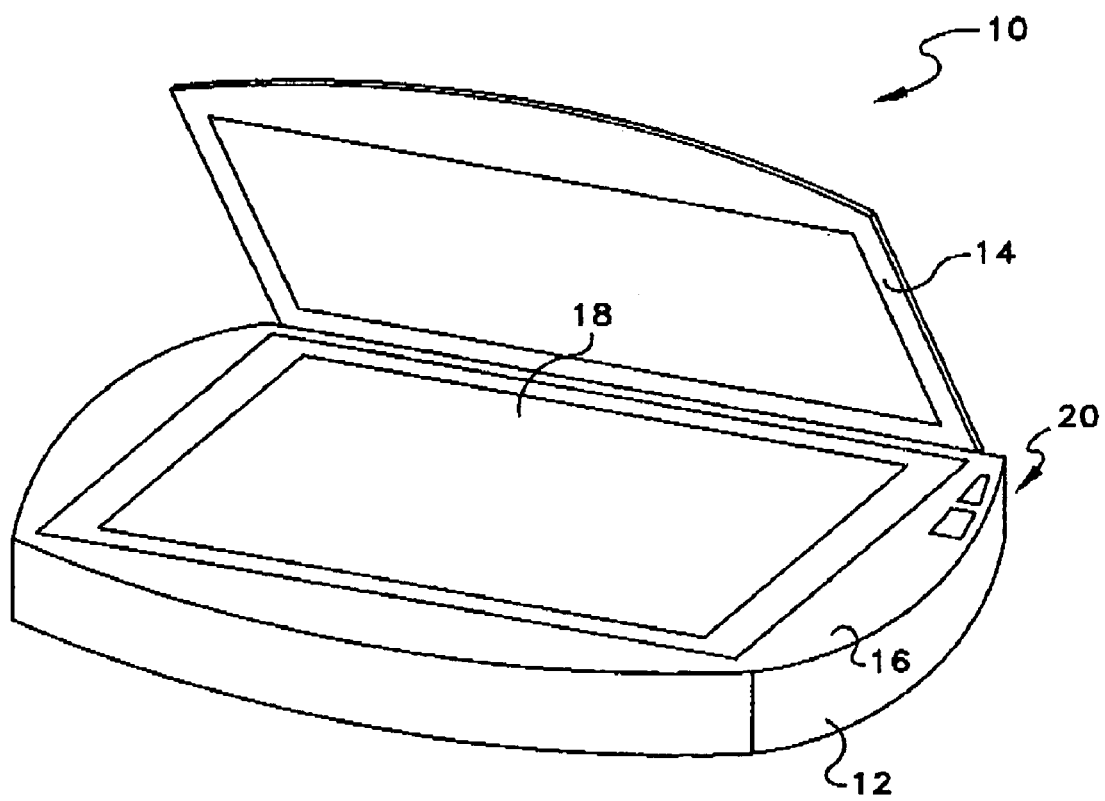
FIG. 1 is a schematic view of a scanner of the present invention.

Referring now in more detail to the drawings, in which like numerals indicate corresponding parts throughout the several views, FIG. 1 illustrates a scanner 10 of the present invention. As indicated in this figure, the scanner 10 generally comprises a housing 12 and a cover 14. Arranged on the top surface 16 of the housing 12 is a platen 18 upon which the image to be scanned is placed during the scanning process. By way of example, the platen is approximately 4 inches wide by 6 inches long so as to have a useful area of approximately 24 square inches. Also provided on the top surface 16 of the housing 12 are one or more operation buttons 20. Although a particular scanner 10 is illustrated in FIG. 1 and described above, it will be understood that the particular physical arrangement of the scanner can take many alternative forms. Accordingly, the principles of the present invention described herein apply to substantially any scanner.

Figure 2:
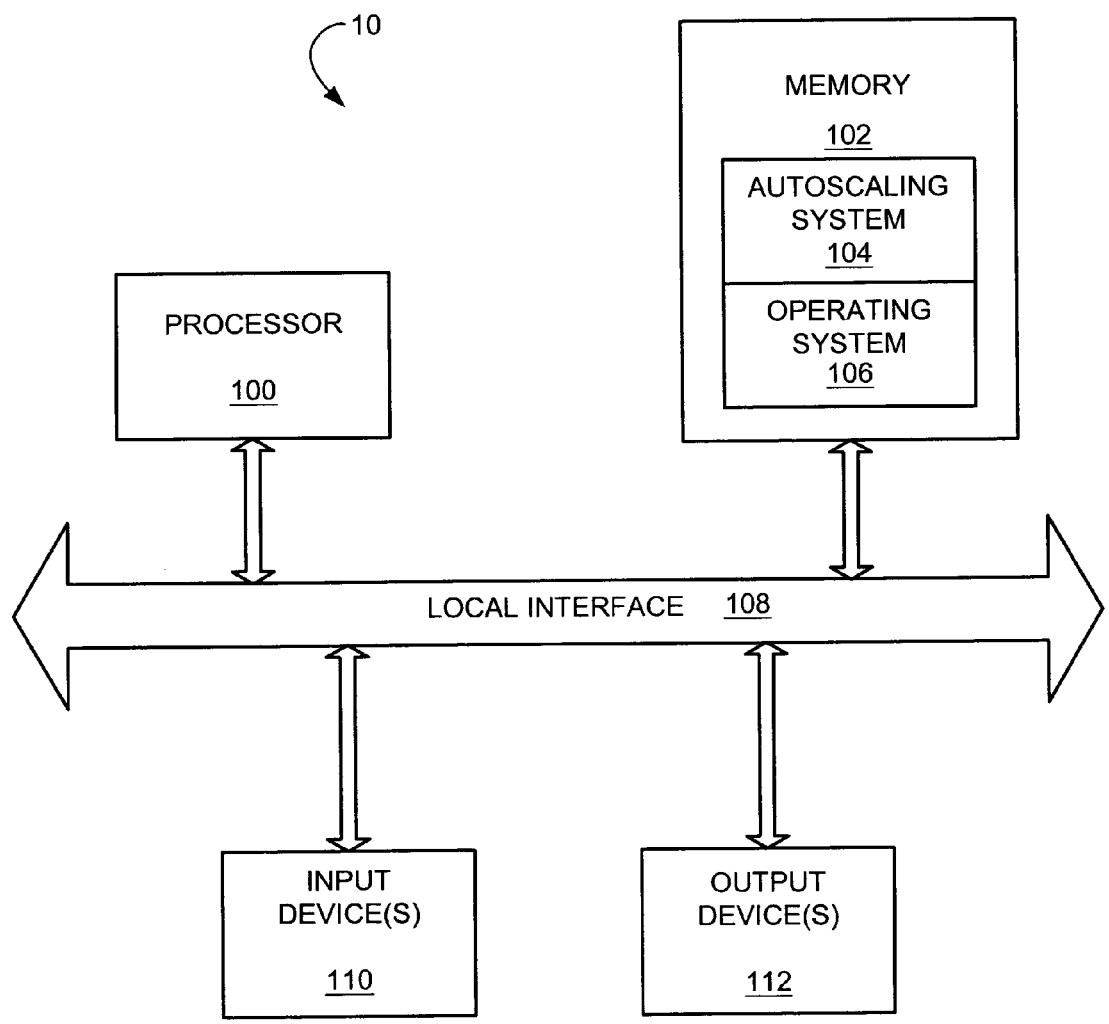
FIG. 2 is a block diagram of the scanner shown in FIG. 2.

FIG. 2 illustrates the functional components of the scanner 10 shown in FIG. 1. As depicted in FIG. 2, the scanner typically comprises a processor 100, a memory 102, a local interface 108, and an output device 112. Typically, the memory 102 includes, inter alia, an autoscaling system 104, as well as an operating system 106. If, as indicated in FIG. 1, the scanner 10 includes operation buttons 20, the input device 110 can comprise one or more of these buttons. As will be appreciated by those having ordinary skill in the art, the autoscaling system 104 can be implemented in software, hardware, or a combination thereof. It is to be noted that when implemented in software, the system can be stored and transported on any computer readable medium for use by or in connection with an instruction execution system, apparatus, or device, such as a computer-based system, processor containing system, or other system that can fetch the instructions from the instruction execution system, apparatus, or device and execute the instructions. In the context of this disclosure, a "computer readable medium" can be any means that can contain, store, communicate, propagate, or transport the program for use by or in connection with the instruction execution system, apparatus, or device. The computer readable medium can be, for example, an electronic, magnetic, optical, electromagnetic, infrared, or semiconductor system, apparatus, device, or propagation medium. More specific examples of computer readable media include the following: an electrical connection (electronic) having one or more wires, affordable computer diskette (magnetic), a random access memory (RAM) (magnetic), a read only memory (ROM) (magnetic), an erasable programmable read only memory (EPROM or Flash memory) (magnetic), an optical fiber (optical), and a portable compact disk read only memory (CD ROM) (optical). It is to be noted that the computer readable medium can even be paper or another suitable medium upon which the program is printed as the program can be electronically captured, via for instance optical scanning of the paper or other medium, then compiled, interpreted, or otherwise processed in a suitable manner if necessary, and then stored in a computer memory.

Figure 3:
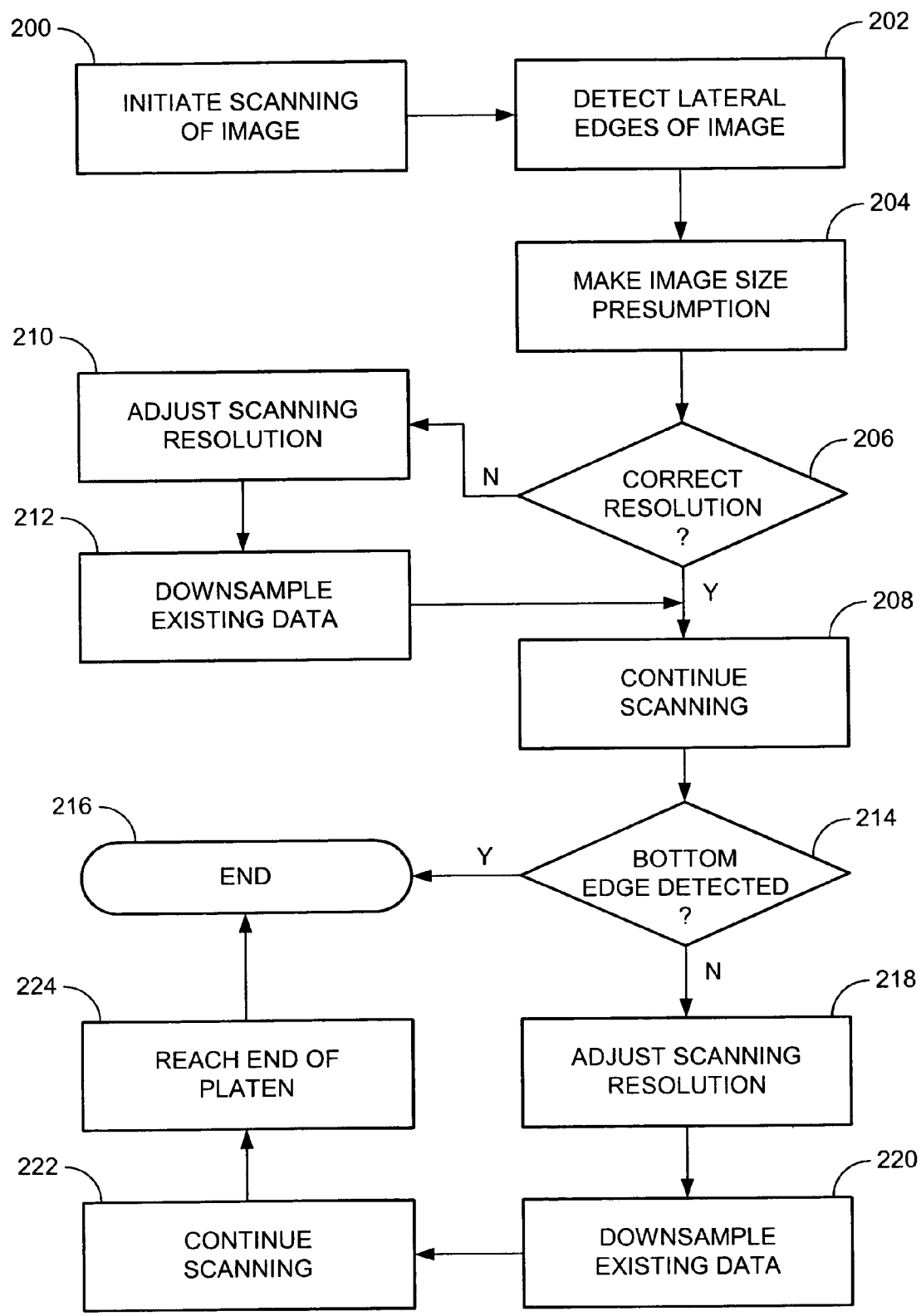
FIG. 3 is a flow diagram of an example automatic scaling method used with the scanner shown in FIG. 1.

With reference to FIG. 3, an automatic scaling method in accordance with the present invention will be discussed. As indicated at block 200, the user first initiates scanning of the original image. By way of example, the image may comprise a conventional photograph of a standard size. As is known in the art, the actual scanning of the image occurs line-by-line across the width of the platen in a transverse direction from one end of the platen to the other. In the Internet appliance context, it is assumed that the scanned image will be displayed on a VGA monitor or a standard television, although other display devices are, of course, contemplated. Accordingly, it is assumed that the display has approximately 480×640 pixels available for imaging. As such, a maximum of approximately 480×640 dots may be scanned to correlate to the available display pixels. In an effort to utilize as much of the available display area regardless of the size of the original image, the scanning resolution is initially set at the optical resolution of the scanner, for example, 300×300 dots per inch (dpi) such that even relatively small original images will occupy a relatively large percentage of the display screen. Although a 300×300 dpi initial scanning resolution is presently contemplated, it will be understood that alternative scanning resolutions can be used if desired.

Figure 4:
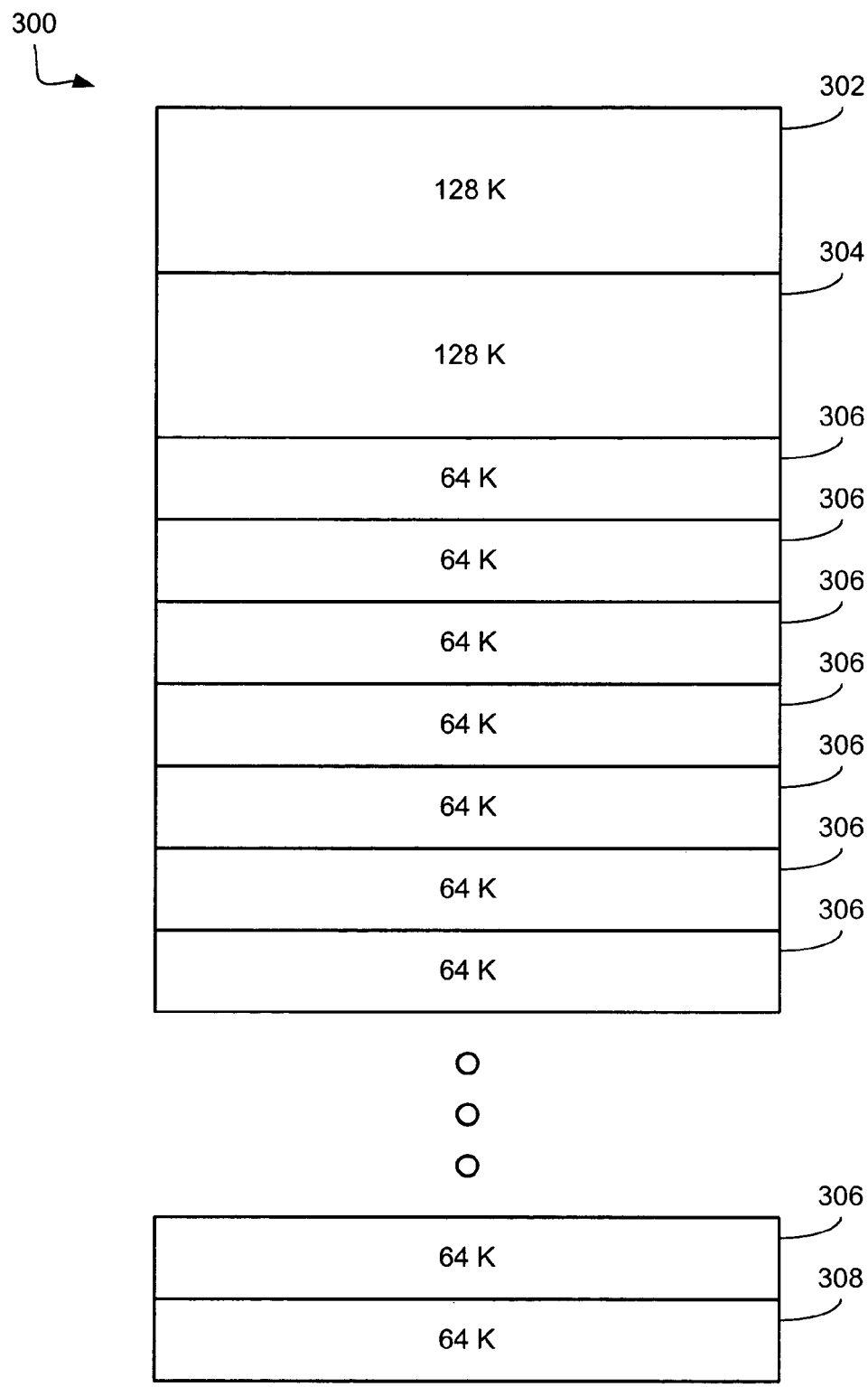
FIG. 4 is a schematic view of a memory partitioned for automatic scaling used in the scanner shown in FIG. 1.

As the various lines of the image are scanned, the collected raw data collected by the scanner is stored into memory 102. By way of example, this data can be stored in dynamic random access memory (DRAM) 300 which can comprise part of the scanner memory 102. FIG. 4 illustrates a schematic view of a portion of the DRAM 300 which as been partitioned for the purpose of automatic scaling. As indicated in this figure, approximately two megabytes (MB) of memory can be set aside for this purpose. As the scanned information is collected, the incoming raw data is first placed in a first line buffer 302. As shown in FIG. 4, this buffer 302 can have a 128 KB capacity. As scanning continues, this first line buffer 302 is filled and the raw data is then stored in the second line buffer 304 which also can comprise a 128 KB capacity. At this point, the raw data from the first buffer 300 is analyzed to obtain an initial scaling determination (described below). Accordingly, the raw data is transferred from the first line buffer 302 to one of several image buffers 306. By way of example, 30 such image buffers can be provided, each having a capacity of 64 KB. Once this data has been transferred, the first line buffer 300 is again available for storage of raw data. When the second line buffer 302 is filled, the incoming raw data can again be stored to the first line buffer 300. Accordingly, the first and second line buffers 300 and 302 can be operated as swing buffers. Also depicted in FIG. 4 is a system buffer 308. This buffer 308 can comprise generally available system memory for the scanner.

Returning to FIG. 3, the scanner detects the relative positions of lateral boundaries of the image being scanned as indicated in block 202. This determination can be made through several known edge detection methods including, by way of example, lid detection and edge contrast detection through the use of a convolution filter. Irrespective of the method with which the edges are detected, the scanner uses the edge location information to make an initial size presumption of the image as indicated in block 204 such that a first scanning resolution determination can be made. To simplify the automatic scaling process, the scanner uses the calculated width of the original image as an estimate of the total size of the image using standard aspect ratios. For instance, if the width of the image is determined to be 2 inches, the scanner assumes the image to have a 2×3 aspect ratio and therefore presumes the length of the image to be 3 inches. Although the "width" of the image is described herein, it is to be understood that the width or length of the image will be determined depending upon which image dimension aligns with the scanning direction of the scanner. As will be discussed in the following, if this presumption is incorrect, the resolution and scaling of the image can be adjusted to ensure that the image will aptly fit the display screen. It is to be understood that other standard sizes can be presumed based upon the detected width of the original image.

Once the width of the original image is detected and a presumption is made as to the total size of the image, the scanner determines whether the initial scanning resolution, e.g., 300×300 dpi, is appropriate for displaying a full image on the target display device. In that the originally selected scanning resolution is relatively high, a small original image normally is scanned at a high enough resolution so as to obtain a full displayed image. Accordingly, rescanning of the image normally will not be necessary even for small original images. This functionality is desired to avoid delays in scanning and subsequent transmission of the image.

As indicated at 206, the scanner determines whether the scanning resolution is correct for the particular original image. If the resolution is correct, i.e., if the resolution will result in a display image which occupies a relatively large percentage of the available display area, scanning is continued as indicated in block 208. If the resolution is not correct however, i.e., the image will be too large for the display screen at the initial scanning resolution, the scanning resolution is adjusted as indicated in block 210. Before making this adjustment, the scanner determines a more suitable scanning resolution for the image. In a first embodiment, the scanner can calculate, e.g. with linear interpolation, a scanning resolution which would result in the image occupying substantially the entire display screen (at least in one of the width and length directions) based upon the aspect ratio assumption so as to maximize the image. In this embodiment, the scanner therefore calculates the number of dots in the width and/or length directions which would substantially equal the number of available pixels in the width and/or length directions of the display device. In another embodiment, the scanner selects one of several predetermined scanning resolutions which would result in a full displayed image. By way of example, these resolutions could be set at, 100×100, 120×120, and 150×150 dpi. In either embodiment, the scaling is adjusted so as to maximize utilization of the available display screen without sacrificing resolution. As is known in the art, the unoccupied screen space can be filled with blanking in the conventional manner.

After or simultaneously with the adjustment of the scaling resolution, the resolution of the already corrected data is similarly adjusted. For the purposes of this application, this step involves downsampling of existing data as indicated in block 212. As is known in the art, downsampling typically involves discarding selected scanned dots to reduce the total number of stored dots of the image. As is further known in the art, this step may involve averaging of the scanned dots such that an accurate representation of the original scanned image is obtained despite the disposal of the unwanted dots.

Scanning of the image continues until the bottom edge of the original image is detected. As indicated at 214, if this bottom edge is detected, the scanning process ends as indicated at 216 and the data is prepared for transmission to a local or remote display device. If, however, the expected bottom edge of the image is not detected where expected based upon the presumed aspect ratio, the scanner makes a second size presumption and adjusts the scanning resolution as indicated in block 218. For example, if the width of the image is determined to be 2 inches and the bottom edge of the image is not detected at approximately 3 inches from the top edge of the image, the scanner determines that the original presumption was incorrect and that the scanning resolution must be adjusted if the image is to fit the display screen. At this point, a second scanning resolution determination is made and the scanning resolution is adjusted in similar manner as described above, and the existing data is downsampled as indicated in block 220. To again simplify the automatic scaling process, the scanner will assume that the length of the image is the entire length of the platen if it is determined that the initial scaling resolution was incorrect. Accordingly, in this example embodiment, the scanner will assume that the original image has a length of approximately 6 inches. Once the scanning resolution has been changed in accordance with this new presumption, scanning continues as indicated in block 222 until the end of the platen is reached as indicated in block 224. The scanning process is then terminated as indicated at block 216, and any remaining processing that is required is conducted on the image data.

While particular embodiments of the invention have been disclosed in detail in the foregoing description and drawings for purposes of example, it will be understood by those skilled in the art that variations and modifications thereof can be made without departing from the spirit and scope of the invention as set forth in the following claims. For instance, although the scanner has been described as only being capable of decreasing the resolution from the optical resolution, it will be understood that rescanning at higher resolution can be conducted, if desired, although such rescanning will increase the time required for the scanning process. In addition, although it is desired to avoid upscaling the images because such upscaling often comprises image quality, such upscaling of scanned data can be conducted, if desired. Furthermore, it will be understood that rescaling may be necessary where the image is to be rotated after being scanned (e.g., portrait vs. landscape). Such scaling is accomplished in the same manner as described in the present disclosure.

What is claimed is:

1. A method for automatically scaling an image, the method comprising:
    scanning an original image at an initial scanning resolution;
    detecting lateral edges of the original image;
    determining the width of the original image based upon the detected lateral edges;
    making a size presumption of the original image based upon the determined width;
    making a scanning resolution determination based upon the size presumption; and
    continuing scanning of the original image based upon the scanning resolution determination.

2. The method of claim 1, wherein the size presumption is based upon an aspect ratio assumption.

3. The method of claim 1, further comprising adjusting the scanning resolution based upon the scanning resolution determination to obtain a new scanning resolution.

4. The method of claim 3, wherein the scanning resolution is adjusted downwardly.

5. The method of claim 3, wherein the new scanning resolution is calculated so as to maximize the image within a screen of a display device.

6. The method of claim 3, wherein the new scanning resolution comprises one of several possible predetermined scanning resolutions.

7. The method of claim 3, further comprising downsampling already collected scanned data such that it has the same resolution as the new scanning resolution.

8. The method of claim 1, further comprising making a second size presumption if a bottom edge is not detected where expected based upon the previous size presumption.

9. The method of claim 8, further comprising making a second scanning resolution determination based upon the second size presumption.

10. The method of claim 9, further comprising adjusting the scanning resolution based upon the second scanning resolution determination to obtain a new scanning resolution.

11. The method of claim 10, wherein the scanning resolution is adjusted downwardly.

12. The method of claim 11, further comprising downsampling already collected scanned data such that it has the same resolution as the new scanning resolution.

13. A computer readable medium having a computer program configured to provide automated image scaling functionality, the computer readable medium comprising:
    logic configured to detect the positions of lateral edges of the original image;
    logic configured to determine the width of the original image based upon the positions of the lateral edges;
    logic configured to make a size presumption of the original image based upon the determined width; and
    logic configured to make a scanning resolution determination based upon the size presumption.

14. The computer readable medium of claim 13, further comprising logic configured to adjust the scanning resolution based upon the scanning resolution determination.

15. The computer readable medium of claim 14, further comprising logic configured to downsample already collected scanned data.

16. The computer readable medium of claim 13, further comprising logic configured to make a second size presumption if a bottom edge is not detected where expected based upon the previous size presumption.

17. The computer readable medium of claim 16, further comprising logic configured to make a second scanning resolution determination based upon the second size presumption.

18. The computer readable medium of claim 17, further comprising logic configured to adjust the scanning resolution based upon the second scanning resolution determination to obtain a new scanning resolution.

19. The computer readable medium of claim 18, further comprising logic configured to downsample already collected scanned data such that it has the same resolution as the new scanning resolution.

20. A scanner comprising:
- means for initially scanning an original image at an initial scanning resolution;
- means for detecting the relative positions of lateral edges of the original image;
- means for determining the width of the original image based upon the positions of the lateral edges;
- means for making an initial size presumption of the original image based upon the determined width;
- means for making a first scanning resolution determination based upon the initial size presumption; and
- means for continuing scanning of the original image based upon the first scanning resolution determination.

21. The scanner of claim 20, further comprising means for adjusting the scanning resolution based upon the first scanning resolution determination to obtain a new scanning resolution.

22. The scanner of claim 21, further comprising means for downsampling already collected scanned data such that it has the same resolution as the new scanning resolution.

23. The scanner of claim 20, further comprising means for making a second size presumption if a bottom edge is not detected where expected based upon the initial size presumption.

24. The scanner of claim 23, further comprising means for making a second scan resolution determination based upon the second size presumption.

25. The scanner of claim 24, further comprising means for adjusting the scanning resolution based upon the second scanning resolution determination to obtain a new scanning resolution.

26. The scanner of claim 25, further comprising means for downsampling already collected scanned data such that it has the same resolution as the new scanning resolution.

* * * * *

UNITED STATES PATENT AND TRADEMARK OFFICE
CERTIFICATE OF CORRECTION

PATENT NO. : 7,079,709 B2 Page 1 of 1
APPLICATION NO. : 10/696184
DATED : July 18, 2006
INVENTOR(S) : Eric F Aas It is certified that error appears in the above-identified patent and that said Letters Patent is hereby corrected as shown below:

On the title page, item (73), in "Assignee", in column 1, line 2, delete "LP." and insert -- L.P. --, therefor.

Signed and Sealed this

Fifth Day of May, 2009

JOHN DOLL
*Acting Director of the United States Patent and Trademark Office*